United States Patent [19]

Linden

[11] Patent Number: 4,736,111
[45] Date of Patent: Apr. 5, 1988

[54] COGENERATION SYSTEM

[76] Inventor: Craig L. Linden, 1335 Midway Dr., Alpine, Calif. 92001

[21] Appl. No.: 933,738

[22] Filed: Nov. 21, 1986

Related U.S. Application Data

[63] Continuation-in-part of Ser. No. 657,205, Oct. 3, 1984, Pat. No. 4,657,290.

[51] Int. Cl.$^4$ .............................................. F02G 5/02
[52] U.S. Cl. ......................................................... 290/2
[58] Field of Search .................. 290/2, 40 R; 60/645, 60/549; 237/12.1; 123/2

[56] References Cited

U.S. PATENT DOCUMENTS

| | | | |
|---|---|---|---|
| 1,077,041 | 10/1913 | Collier | 237/12.1 |
| 2,076,382 | 4/1937 | Minton | 290/2 |
| 2,273,502 | 2/1942 | Couse | 237/12.1 |
| 3,648,643 | 3/1972 | Murray | 115/0.5 R |
| 3,723,027 | 3/1973 | Montelius | 417/313 |
| 3,805,082 | 4/1974 | Murray | 290/2 X |
| 3,822,740 | 7/1974 | Hackett | 165/45 |
| 3,858,802 | 1/1975 | Stobart | 237/12.1 |
| 3,944,837 | 3/1976 | Meyers et al. | 290/40 R |
| 4,065,055 | 12/1977 | De Cosimo | 290/2 X |
| 4,150,300 | 4/1979 | Van Winkle | 290/2 |
| 4,226,214 | 10/1980 | Palazetti | 123/2 |
| 4,262,209 | 4/1981 | Berner | 290/2 X |
| 4,264,826 | 4/1981 | Ullmann | 290/2 X |
| 4,291,834 | 9/1981 | Palazzetti et al. | 237/12.1 |
| 4,330,084 | 5/1982 | Buchner et al. | 290/24 |
| 4,384,673 | 5/1983 | Carson | 237/12.1 |
| 4,385,725 | 5/1983 | Pischlinger | 237/12.1 |
| 4,495,901 | 1/1985 | Nannini et al. | 123/2 |
| 4,503,337 | 3/1985 | Hafner et al. | 290/2 X |
| 4,510,756 | 4/1985 | Hise et al. | 290/2 X |
| 4,527,071 | 7/1985 | Ausiello | 290/2 X |
| 4,548,164 | 10/1985 | Ylonen et al. | 123/2 |

FOREIGN PATENT DOCUMENTS 3239654 5/1984 Fed. Rep. of Germany .

OTHER PUBLICATIONS

Cagen Intelligence Monthly, vol. 5, No. 4, Oct. 1986, Cogenic, Suite 331, Box 5000, Del Mar, CA 92014.

Primary Examiner—William M. Shoop, Jr.
Assistant Examiner—W. E. Duncanson, Jr.
Attorney, Agent, or Firm—Fulwider, Patton, Rieber, Lee & Utecht

[57] ABSTRACT

A cogeneration system utilizing a liquid cooled prime mover for on-site generation of electrical and thermal energy. A radiant heat retardant material surrounds the prime mover to prevent its cooling through radiation whereby the heat otherwise radiated is absorbed by the coolant for extraction by a heat exchanger.

25 Claims, 2 Drawing Sheets

COGENERATION SYSTEM

CROSS REFERENCE TO RELATED APPLICATION

This application is a continuation-in-part of U.S. patent application Ser. No. 657,205, filed Oct. 3, 1984, U.S. Pat. No. 4,657,290, and entitled "Co-Generation Plant Module System."

BACKGROUND OF THE INVENTION

1. Field of the Invention

The present invention relates to a cogeneration system, and particularly to a cogeneration system for on-site generation of electrical and thermal energy.

2. Description of the Prior Art

Cogeneration to supply on-site electrical and thermal energy needs is a proven technique which is becoming cost effective for smaller energy users as its efficiencies of operation improve. Federal legislation also provides significant economic incentives for smaller users to turn to cogeneration. Utilities are required to provide back-up power on shut down of a cogeneration unit and must purchase any excess electricity generated.

There has been considerable research and development effort in the prior art to develop an economically viable cogeneration unit for the smaller energy user with both power and thermal energy needs. A satisfactory unit must be compact and capable of fully automated, substantially noise-free operation. It has to be simple to install and operate and, above all, it must be highly efficient in converting a high percentage of the energy in the operating fuel into electrical and thermal energy for all on-site electrical, cooling and heating needs, at a price competitive with central utility services.

A typical prior art cogeneration unit employs a water cooled internal combustion engine in combination with an electrical generator. The efficiency of such an engine generator combination depends to a great extent upon the amount of so-called "waste" heat which can be recovered from the engine exhaust and engine coolant for heating and cooling needs. In many instances the engine-generator set is mounted in the open on a concrete pad or the like and no effort is made to recover heat which is lost through radiation to the atmosphere. In fact, many designs rely on heat radiation for engine cooling.

In some systems of the prior art the engine and generator are housed within a thermally insulated enclosure to capture radiated heat, and also to attenuate the sound level of operation. U.S. Pat. Nos. 4,262,209, issued Apr. 14, 1981 to Berner, and 4,495,901, issued Jan. 29, 1985 to Nannini et al, are representative of this type of arrangement. The latter patent teaches a system in which intake air for the engine is circulated through the enclosure for preheating, which tends to capture some of the radiated heat and reduce the air temperature in the enclosure. However, there is evidence that the carburetor is incapable of drawing in enough heated air to maintain an enclosure temperature sufficiently low to prevent heat damage to various externally located engine and generator components. In addition, preheating of the air results in a less dense fuel charge to the engine and undesirably reduces the rated horsepower of the engine.

U.S. Pat. Nos. 4,226,214, issued Oct. 7, 1980 to Palazzetti, and 4,548,164, issued Oct. 22, 1985 to Ylonen et al also disclose cogeneration units housed in insulated enclosures through which air is circulated.

An added disadvantage of prior art systems employing an engine enclosure is their location of the carburetor in the enclosure. This presents a serious explosion hazard because there is always the possibility of leakage of the fuel/air mixture into the enclosure.

Without exception, prior art systems capture radiated heat inefficiently, if at all. The air circulation systems have the disadvantages mentioned, and also necessarily require a circulation fan or heat exchanger or the like, all of which add expense and complexity.

Yet other systems of the prior art provide a combination of sound attenuation and engine cooling by placing the engine within a watertight enclosure which in turn is submerged in a tank of water. Such systems are disclosed in U.S. Pat. Nos. 3,723,027, issued Mar. 27, 1973 to Montellus, and 3,805,082, issued Apr. 16, 1974 to Murray. The system of the latter patent circulates air through the enclosed engine space for engine cooling.

None of the prior art teachings appear to recognize the importance of preventing radiation heat loss. When the engine is enclosed in a thermally insulated enclosure, heat is radiated until the enclosure air reaches a temperature approximating that of the engine. On engine start-up the enclosure acts as a heat sink soaking up heat and slowing engine warm-up, and then losing that heat on engine shut-down. Frequent engine start-ups and shut-downs significantly reduce the efficiency of the system. The situation is not greatly improved if a circulating air fan is used to scavenge some of the heated air for use as engine intake air, as discussed above, and heat exchangers are not sufficiently efficient. It seems apparent that a loss of radiated heat is accepted in the prior art as a necessary consequence of engine cooling.

SUMMARY OF THE INVENTION

Contrary to conventional thinking that heat radiation is necessary for proper engine cooling, the present invention substantially prevents such heat radiation. By causing nearly all of the engine "waste" heat to be retained in the engine exhaust and coolant, almost all of the engine heat can be captured for heating and cooling needs. In addition, the present system does not involve the wasteful heating and cooling of a large volume of enclosure air on engine start-up and shut-down. A recent study verifies losses of overall thermal efficiency in one prior art system as a result of successive cold starts, indicating that eighteen minutes was required to bring the system temperature up to the proper heat recovery rate.

By quickly bring the engine up to proper operating temperature and maintaining it at higher temperatures for longer periods of time, the present system also prevents oil break down and greatly reduces acid formation and sludge condensation in the engine.

According to preferred embodiments of the present invention, radiant heat waste in a cogeneration system is substantially eliminated by removing the externally located movable parts of the prime mover or engine and surrounding the exterior engine surfaces with a low heat conductivity material. The material can be air under vacuum, an inert gas such as argon or the like, but preferably is a fluent particulate material such as vermiculite. Chips of vermiculite are arranged in the engine enclosure to cover all the engine exterior surfaces.

This is made possible by the removal of movable parts such as the fan, fan belt, etc.

The low heat conductivity material blocks the escape of radiant heat. Instead such heat is substantially completely absorbed in the engine exhaust and coolant, from which it can be efficiently extracted by usual heat exchangers or the like. This arrangement improves the overall efficiency of the system in the order of approximately ten percent.

Although cogeneration units can burn various fuels, including diesel oil and gasoline, propane and particularly natural gas are preferred because of their low cost and ready availability. Leakage of natural gas within the engine enclosure of the present system is unlikely because the carburetor is externally located. Moreover, if fuel line leakage does occur, an explosion is unlikely because the engine enclosure is filled with low heat conductivity material. Further, in the embodiment employing particulate matter the engine enclosure is preferably charged with nitrogen or the like to a pressure above that of the natural gas. The enclosure pressure is then monitored to detect any drop in pressure. Such a drop would signal a leak in the natural gas delivery system because nitrogen would be flowing into the leak. The pressure drop is then utilized to automatically shut off further fuel flow.

Other aspects and advantages of the present invention will become apparent from the following more detailed description taken in conjunction with the accompanying drawings.

DESCRIPTION OF THE PREFERRED EMBODIMENTS

Figure 1:
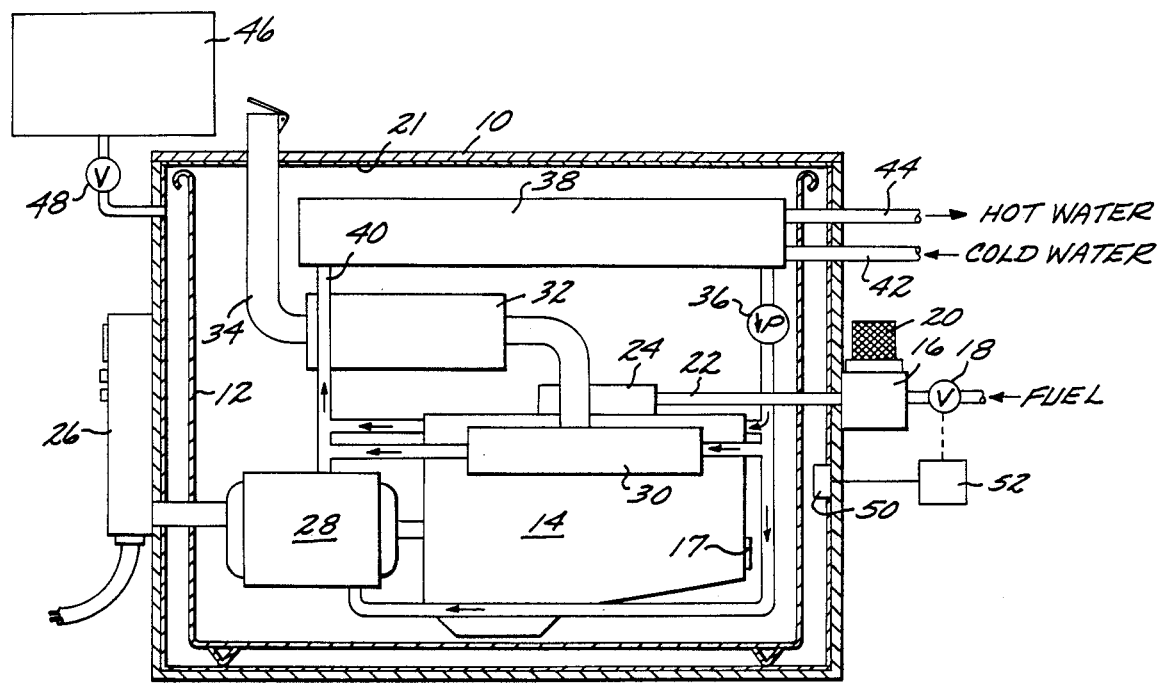
FIG. 1 is a partially schematic longitudinal cross-sectional view of a cogeneration system according to the present invention, utilizing an air vacuum, argon gas or the like as the low heat conductivity material.

Referring now to FIG. 1, there is illustrated a schematic or simplified physical arrangement of the various elements of a cogeneration system. Many of the individual components of the system are omitted for brevity since they are well known. For example, the electronic circuitry, automatic controls, sensors, make-up water supply and carburetion components are only schematically illustrated, if at all. The selection and integration of such components into the system to accomplish the functions described will be obvious to those skilled in the art.

The majority of the components of the present combustion system are contained or housed within a walled, preferably hermetically sealed housing or enclosure 10. The walls of the enclosure 10 may be thermally insulated, but this is generally not necessary because of the presence in the housing 10 of low heat conductivity material, as will be seen. However, in the embodiment of FIG. 1 it may be desirable to use housing walls incorporating acoustical insulation for sound attenuation.

The components of the system are supported in any suitable fashion upon a removable, upwardly open, box-like carrier 12 located within the housing 10 and fitted with short legs or angles for engagement with the housing bottom. This permits the system components to be lifted out of the housing 10 for servicing after the usual electrical leads and conduits that extend between the system components and the exterior of the housing are disconnected. If desired, the carrier 12 can be omitted and the system components secured directly to the housing by shock mounts or the like.

The cogeneration system includes a prime mover or engine 14 which preferably is a water cooled, four cylinder, high compression, natural gas fueled type. However, the use of a particular type of prime mover is not critical to the invention, so long as it is characterized by the generation of heat. The engine 14 is a conventional gasoline engine design except that its carburetion system or assembly 16 is modified to accept gaseous fuel such as propane or natural gas. In addition, particularly in the embodiments of FIGS. 2-4, the engine is specially modified by removing conventional movable components such as the fan, the belts and pulleys, the water pump, and any mechanical governors and control linkages. Such components are then either located externally of the engine enclosure, or components are used which do not have external portions which move and which would be affected by any surrounding low heat conductivity material. For example, an electrical water pump 36 and electrical governor (not shown) can be located internally of the enclosure since they need not be mechanically coupled to the engine. Preferably the engine opening adjacent the front end of the crankshaft is sealed off by a cover 17. The rear crankshaft opening is similarly sealed off in the embodiment of FIG. 1 by sealed attachment to the engine of the housing of the generator 28, as will be seen. If desired, the rear opening could instead be sealed off by a cover similar to the cover 17.

The natural gas fuel passes from a suitable fuel source (not shown), through a solenoid actuated valve 18, through a pressure regulator 19, and then to the carburetor assembly 16, which is externally located and attached to an outside wall of the enclosure.

In operation, naturally aspirated air passes through an intake or filter 20 into the carburetor assembly 16. The fuel/air mixture from assembly 16 is then carried by an intake conduit 22 to an intake manifold 24 for passage to the engine cylinders. Electrical interconnections (not shown) are provided to enable the valve 18 to be operated from a control panel 26 in response to monitoring sensors (not shown) such as a thermostat or the like. Also not shown are suitable means which can be associated with the control panel for shunting unused electrical energy to a central power utility. Conventional means to accomplish the functions just mentioned are well known and are therefore not described.

The engine 14 may be coupled to any suitable power transducing device to convert the mechanical force provided by the engine to the desired form of energy, electrical power in the case of a generator, thermal energy in the case of a heat pump, or other forms of energy, as required.

In the embodiment of FIG. 1 the engine 14 is connected to a power transducer in the form of an electrical generator 28 by suitable coupling arrangements which permit the generator 28 to be used to start the engine 14, and to be driven by the engine to produce electricity. The generator is preferably a water cooled, three phase induction type capable of a power output of approximately twenty kilowatts. Of course, the size and capacity of the system components can be designed to provide whatever level of power is desired, or a number of the systems can be combined or coupled to provide the desired overall power output.

The generator 28 is preferably fluid sealed and liquid cooled. However, an air cooled type can be used if it is located outside the enclosure or within a separately partitioned part of the enclosure. The engine connection would then be through the enclosure or the partition wall, as the case may be.

Exhaust gases from engine 14 pass into an exhaust manifold 30, and then to a muffler/exhaust heat exchanger 32. A discharge or exhaust conduit 34 carries the cooled exhaust gases from the heat exchanger 32 to the outside of the housing 10.

The path of the engine cooling water is shown in schematic form, many of the standard cooling system components being omitted for brevity. Water is circulated through the system by an electrical circulation pump 36 located between the outlet of a heat exchanger 38 and the usual engine water jacket inlet. Water from the pump 36 also passes to the inlet of a water jacket surrounding the generator and a water jacket surrounding the exhaust manifold 30. Heated water from these jackets then passes through a conduit 40 to the large heat exchanger 38.

The water paths just described constitute the primary circuit for the heat exchanger 38. The secondary circuit which extracts heat from the primary circuit receives cold water from a conduit 42, and heated water is discharged from the heat exchanger 38 through a conduit 44. The heated water can be used to satisfy the hot water needs of the user, or used to make steam for circulating through space heating radiators, or used to operate absorption chillers for space cooling.

The efficiency of the cogeneration system is markedly improved by retarding or blocking the flow of radiated heat from the components of the system, and particularly the exterior surfaces of the engine 14.

In the embodiment of FIG. 1 a significant reduction in the flow or escape of radiated heat is achieved by charging the interior of the housing 10 with air under vacuum, or with a relatively inert gas of low thermal conductivity such as argon. The air or gas is supplied from a source 46 in fluid communication with the interior of the housing 10 under the control of a valve 48. The presence of the air or gas prevents the development of a combustible or explosive mixture in the interior of the housing 10. Further, if the gas is an inert gas which is pressurized to a pressure greater than that of the gaseous fuel, pressure monitoring will detect the presence of a leakage opening in the fuel delivery system. For this purpose a usual and conventional pressure transducer 50 can be attached to the interior of the housing 10, and coupled to a relay 52 for shutting off the solenoid actuated fuel valve 18 when the transducer 50 senses a pressure drop below a predetermined level. This would signal a flow of inert gas into the leakage opening in the lower pressure fuel delivery system, and would also prevent leakage of the gaseous fuel from the opening.

In the event the low thermal conductivity material is air under a vacuum, a change in enclosure pressure would similarly signal a leakage in the fuel delivery system. It should be noted that when the enclosure is to be under a vacuum, it is important to utilize the cover 17 at the front of the engine, and a similar cover or sealed generator coupling at the rear of the engine, to prevent higher pressure crankcase gases from flowing into the evacuated enclosure. In addition, the generator should be of a hermetically sealed type, or be located externally of the evacuated portion of the enclosure.

In all embodiments of the invention it is greatly preferred to employ the externally located carburetor assembly 16. Since the carburetion system is the primary source of potential fuel leakage its location outside the enclosure 10 greatly reduces the potential for any collection of gaseous fuel which might possibly explode. In the known systems of the prior art the carburetion system is located within the engine enclosure and there is a dangerous potential for explosions, and also a potential for vapor fuel locks in the case of liquid fueled engines.

To further block the escape of radiant heat, the interior of the enclosure may be covered with a layer of reflective material 21, such as Mylar material covered with a thin film of aluminum.

Figure 2:
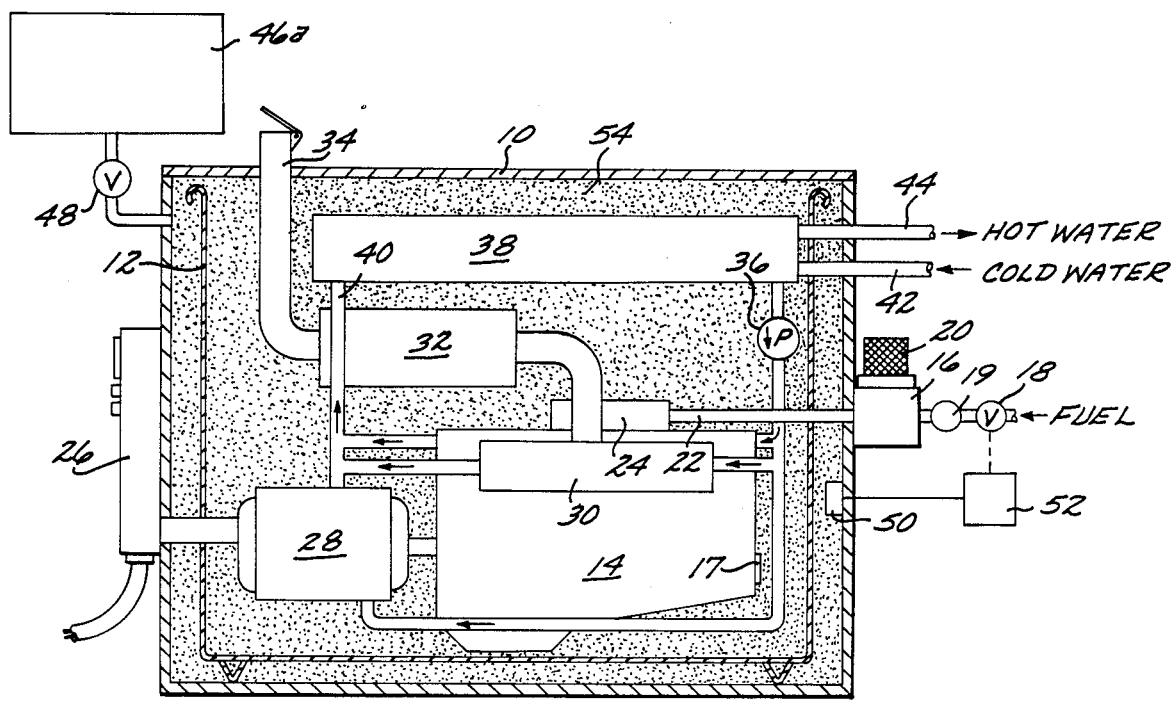
FIG. 2 is a view similar to FIG. 1, but illustrating an embodiment in which fluent particulate material is utilized as the low heat conductivity material.

The cogeneration system of FIG. 2 is substantially identical in all respects to that of FIG. 1 except that a much more efficient low thermal conductivity material is employed. In the system of FIG. 2 the heat insulation or low thermal conductivity material is a bulk insulation material such as expanded vermiculite. It can also take the form of mineral wool, vegetable fibers, organic papers, expanded perlite, cellular glass, or the like. It may also be a reflective material such as layers of aluminum coated Mylar film. The material selected should be chosen for its ability to retard the flow of radiant heat. In the case of vermiculite particles this is done by breaking up the heat flow path and utilizing its opacity to radiant heat.

Figure 3:
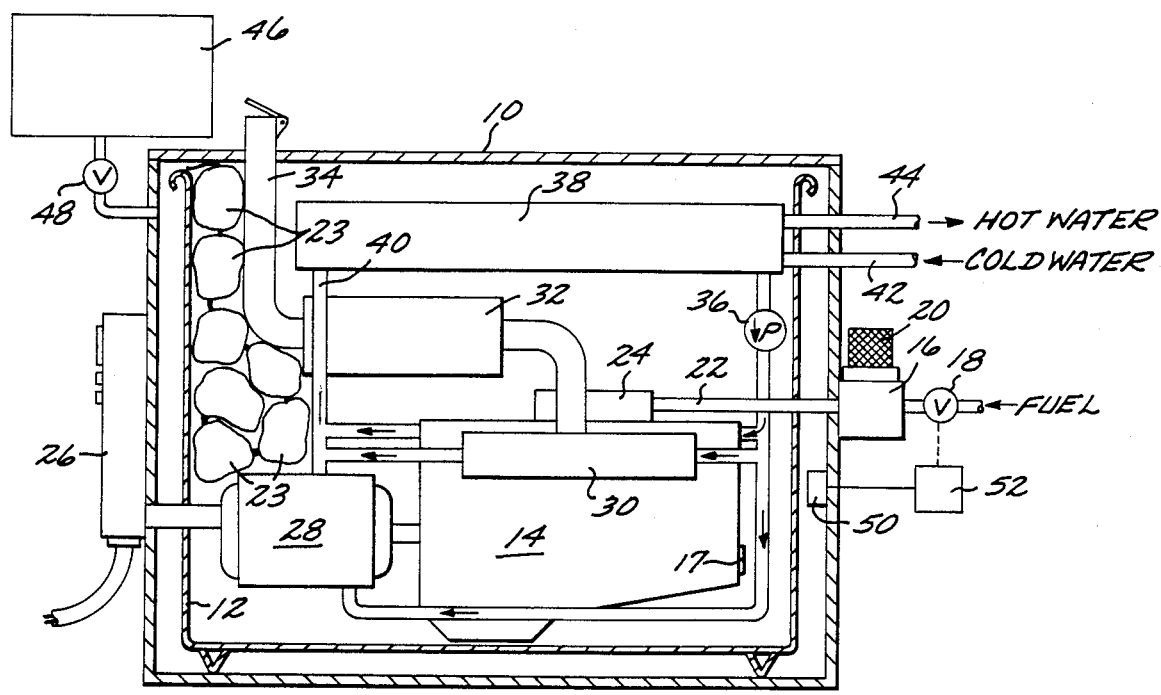
FIG. 3 is a view similar to FIG. 3, illustrating an embodiment in which the particulate matter of the FIG. 2 embodiment is located in bags which fill the engine enclosure.

The preferred vermiculite material is in particle form or loose fill, as shown in FIG. 2, although it could be made in "bean bag" form, as shown in FIG. 3, in which bags 23 are strung together so that they can be more easily removed from the enclosure 10 when it is necessary to service the cogeneration system components. The bags 23 are only partially shown and it should be understood that they surround the engine and preferably entirely fill the enclosure.

The particle vermiculite is relatively easily removed by employing a commercial vacuum machine.

In the system of FIG. 2 the fluent granules or particles arrange themselves closely adjacent the radiating surfaces of the system components. Interstices or minute voids between the fluent particles 54 are filled or charged with a gas such as nitrogen from a source 46a under the control of a valve 48. The gas is incapable of supporting combustion and is pressurized to a level above the pressure of the gaseous fuel source, just as described in conjunction with the embodiment of FIG. 1, and for the same purpose of detection of a leakage opening in the gaseous fuel supply system.

Figure 4:
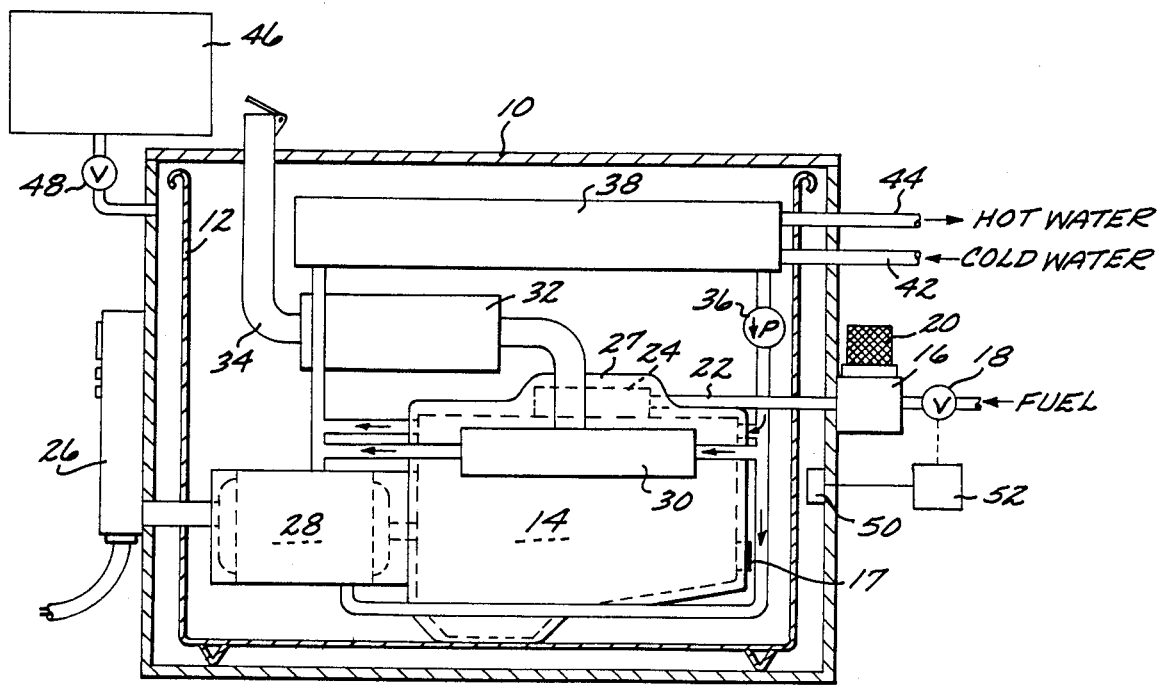
FIG. 4 is a view similar to FIG. 3, but illustrating an embodiment in which the low heat conductivity material is in the form of a relatively thick blanket or shell around the engine.

FIG. 4 illustrates an embodiment substantially identical to that of FIG. 3, except that a blanket or shell 27 is used as the low thermal conductivity material. If in blanket form the material would preferably be in composite form comprising woven ceramic inner and outer layers and an intermediate layer of suitable bulk insulation such as vermiculite. If in shell form the material would conveniently be made of any suitable molded high temperature rated plastic foam material. The thickness and type of material in the blanket or shell 27 may vary as required by the particular application, and the materials mentioned are given only by way of example.

From the foregoing it can be seen that substantial energy savings are achieved by reducing or substantially eliminating the loss of heat radiated from the engine surfaces. The increased efficiency places the overall system efficiency in the high ninety percent range. In addition to the reduction in radiation heat loss, radiation heat insulating material prevents abrupt drops in the temperature of the engine components on engine shutdown, reducing metal shock and warpage, and maintains the oil at higher temperatures for longer periods of time.

Sludge is a mixture which includes harmful acid components and its formation at low engine temperatures is a prime factor in causing engine damage. Sludge is formed by a mixing of combustion gases with oil mist in the crankcase, followed by condensation on cold engine surfaces. When the engine is warm the gases remain in harmless gaseous form, and on engine start-up the warm oil is better able to flow through components such as the oil filter without damaging pressure impact and consequent filter and gasket failure. Keeping engine temperatures high for longer periods of time thus has benefits in addition to improved system efficiency.

The radiation heat insulation material also has the important benefit that it protects the cogeneration system components from the adverse effects of freezing external temperatures. However, the major feature of the invention is the marked improvement in overall system efficiency gained by capturing heat which would otherwise be lost through radiation.

With respect to the preferred embodiments, in which solid low heat conductivity material, either in particle, "bean-bag", blanket or shell form, engages and surrounds the engine, it is the unique concept of stripping the engine exterior surfaces of movable components which makes this possible. Heretofore, covering of an operating engine with heat insulating material was apparently never attempted because of the presence of moving parts such as fans and belts on a conventional engine. The use of such heat insulating engine coverings for improved efficiency has wide applications.

Various modifications and changes may be made with regard to the foregoing detailed description without departing from the spirit of the invention.

I claim:

1. A cogeneration system comprising:
   a prime mover characterized in operation by the generation of heat and adapted to be coupled to a power transducer;
   containment means enclosing said prime mover and including low heat conductivity material completely surrounding said prime mover in closely adjacent relationship and thereby retarding the flow of radiated heat from said prime mover;
   means for supplying air from outside said containment means to said prime mover;
   means for supplying fuel from outside said containment means to said prime mover;
   means for conveying exhaust gas from said prime mover to the outside of said containment means; and
   means for circulating cooling fluid through said prime mover for collection of heat generated by said prime mover, and for circulating said cooling fluid to the exterior of said containment means for extraction of said heat generated by said prime mover, said low heat conductivity material acting as a thermal barrier tending to cause said radiated heat to be absorbed by said cooling fluid.

2. A cogeneration system according to claim 1 wherein said prime mover is an internal combustion engine, and wherein said transducer is an electrical generator located in said containment means, said cooling fluid also being circulated through said electrical generator by said means for circulating cooling fluid.

3. A cogeneration system according to claim 1 wherein said containment means comprises an enclosure having an internal chamber whose otherwise unoccupied spaces are filled with said low heat conductivity material.

4. A cogeneration system according to claim 3 wherein said low heat conductivity material comprises a fluent particulate material conformable to irregular contours.

5. A cogeneration system according to claim 3 wherein said low heat conductivity material comprises particles of vermiculite.

6. A cogeneration system according to claim 3 wherein said low heat conductivity material comprises an inert gas.

7. A cogeneration system according to claim 3 wherein said low heat conductivity material comprises air at subatmosphere pressure.

8. A cogeneration system according to claim 3 wherein said low heat conductivity material comprises heat insulating material in a plurality of interconnected bags movable relative to each other for ease of placement and removal relative to said enclosure.

9. A cogeneration system according to claim 3 wherein said enclosure is fluid tight; and including means for pressurizing said enclosure with an inert gas, and means for detecting a change of pressure in said enclosure whereby the presence of a fuel leakage opening in the components in said enclosure can be detected.

10. A cogeneration system according to claim 6 wherein said gas is nitrogen for preventing an accumulation and explosion of gaseous fuel within said enclosure.

11. A cogeneration system according to claim 1 wherein said means for supplying fuel includes fuel carburetion means located externally of said containment means whereby any fuel leakage from said fuel carburetion means is isolated from the interior of said containment means.

12. A cogeneration system comprising:
   an internal combustion engine and a transducing device coupled together and characterized in operation by the generation of heat including radiated heat from the external surfaces of said engine;
   an enclosure housing enclosing said engine and including radiation heat flow retardant material disposed in conformable, completely surrounding relationship relative to said surfaces, thereby tending to retard the flow of said radiated heat;
   means for carrying the product of said transducing device to the outside of said enclosure;
   means for supplying air from outside said enclosure to said engine;
   means for supplying fuel from outside said enclosure to said engine;
   means for conveying exhaust gas from said engine to the outside of said enclosure; and means for circulating cooling fluid through said engine for collection of heat generated by said engine and for circulating said cooling fluid to the exterior of said enclosure for extraction of said heat, said heat flow retardant material acting as a thermal barrier tending to cause said radiated heat to be absorbed by said cooling fluid.

13. A cogeneration system according to claim 12 wherein said retardant material comprises particulate matter.

14. A cogeneration system according to claim 12 wherein said low heat flow retardant material comprises particles of vermiculite.

15. A cogeneration system according to claim 12 wherein said enclosure is fluid tight, and including means for pressurizing said enclosure with an inert gas, and means for detecting a change of pressure in said enclosure whereby the presence of a fuel leakage opening in the components in said enclosure can be detected.

16. A cogeneration system according to claim 15 wherein said gas is nitrogen for preventing an accumulation and explosion of gaseous fuel leaking into said enclosure.

17. A cogeneration system according to claim 12 wherein said means for supplying fuel includes fuel carburetion means located externally of said enclosure whereby any fuel leakage from said fuel carburetion means is isolated from the interior of said enclosure.

18. A cogeneration system according to claim 12 wherein said means for supplying fuel comprises a natural gas delivery system.

19. A cogeneration system comprising:
a prime mover characterized in operation by the generation of heat, the exterior surfaces of said prime mover being characterized by an absence of moving parts;
containment means including low heat conductivity material in solid form completely surrounding and engaging said exterior surfaces and thereby retarding heat radiation from said prime mover; and
means for circulating cooling fluid through said prime mover for collection of heat generated by said prime mover, and for circulating said cooling fluid to the exterior of said containment means for extraction of said heat generated by said prime mover.

20. A cogeneration system according to claim 19 wherein said containment means comprises an enclosure having an internal chamber whose otherwise unoccupied spaces are filled with solid form low heat conductivity material comprising particles of fluent material.

21. A cogeneration system according to claim 19 wherein said low heat conductivity material comprises a layer of heat insulating material.

22. A cogeneration system comprising:
an engine characterized in operation by the generation of heat;
an enclosure housing said engine;
carburetion means located externally of said enclosure and operative to provide a fuel/air mixture;
means for conveying said mixture from outside said enclosure to said engine; and
means for circulating cooling fluid through said engine for collection of heat generated by said engine and for circulating said cooling fluid to the exterior of said enclosure for extraction of said heat.

23. A cogeneration system comprising:
a prime mover characterized in operation by the generation of heat and adapted to be coupled to a power transducer;
containment means around said prime mover, including low heat conductivity material surrounding said prime mover sufficiently to substantially reduce the flow of radiated heat from said prime mover;
means for supplying air from outside said containment means to said prime mover;
means for supplying fuel from outside said containment means to said prime mover;
means for conveying exhaust gas from said prime mover to the outside of said containment means; and
means for circulating cooling fluid through said prime mover for collection of heat generated by said prime mover, said low heat conductivity material acting as a thermal barrier tending to cause said radiated heat to be absorbed by said cooling fluid.

24. A cogeneration system according to claim 23 wherein said low heat conductivity material comprises a blanket of heat insulating material.

25. A cogeneration system according to claim 23 wherein said low heat conductivity material comprises a shell of heat insulating material.

* * * * *